United States Patent [19]

Kim et al.

[11] Patent Number: 5,645,953
[45] Date of Patent: Jul. 8, 1997

[54] SECONDARY BATTERY AND METHOD FOR CONTROLLING THE SELF-DISCHARGE OF A NICKEL/METAL HYDRIDE SECONDARY BATTERY

[75] Inventors: Young-Woo Kim, Seoul; Sung-Keun Lee, Ansan; Jai-Young Lee, Seoul; Jon-Ha Lee; Han-Ho Lee, both of Daejeon, all of Rep. of Korea

[73] Assignee: Hyundai Motor Company, Ltd., Seoul, Rep. of Korea

[21] Appl. No.: 690,559

[22] Filed: Jul. 31, 1996

Related U.S. Application Data

[63] Continuation-in-part of Ser. No. 434,532, May 4, 1995, abandoned.

[30] Foreign Application Priority Data

May 4, 1994 [KR] Rep. of Korea .................... 94-9779

[51] Int. Cl.$^6$ ........................................ H01M 6/14
[52] U.S. Cl. .............................. 429/48; 429/101
[58] Field of Search ...................... 429/48, 101, 59, 429/218, 223

[56] References Cited

U.S. PATENT DOCUMENTS

| | | | |
|---|---|---|---|
| 4,269,905 | 5/1981 | Nedlake | 429/8 |
| 4,935,318 | 6/1990 | Ikoma et al. | 429/206 |
| 5,082,754 | 1/1992 | Jones | 429/101 |
| 5,108,851 | 4/1992 | Furukawa et al. | 429/59 |
| 5,219,678 | 6/1993 | Hasebe et al. | 429/59 |
| 5,328,777 | 7/1994 | Bentz et al. | 429/27 |
| 5,332,631 | 7/1994 | Abraham et al. | 429/48 |

*Primary Examiner*—M. Nuzzolillo
*Attorney, Agent, or Firm*—Birch, Stewart, Kolasch & Birch, LLP

[57] ABSTRACT

A nickel/metal hydride secondary battery which exhibits a minimal amount of self-discharge, the secondary battery having battery cells in which the environment thereof is a gas environment of hydrogen gas or a hydrogen-inert gas mixture.

8 Claims, 4 Drawing Sheets

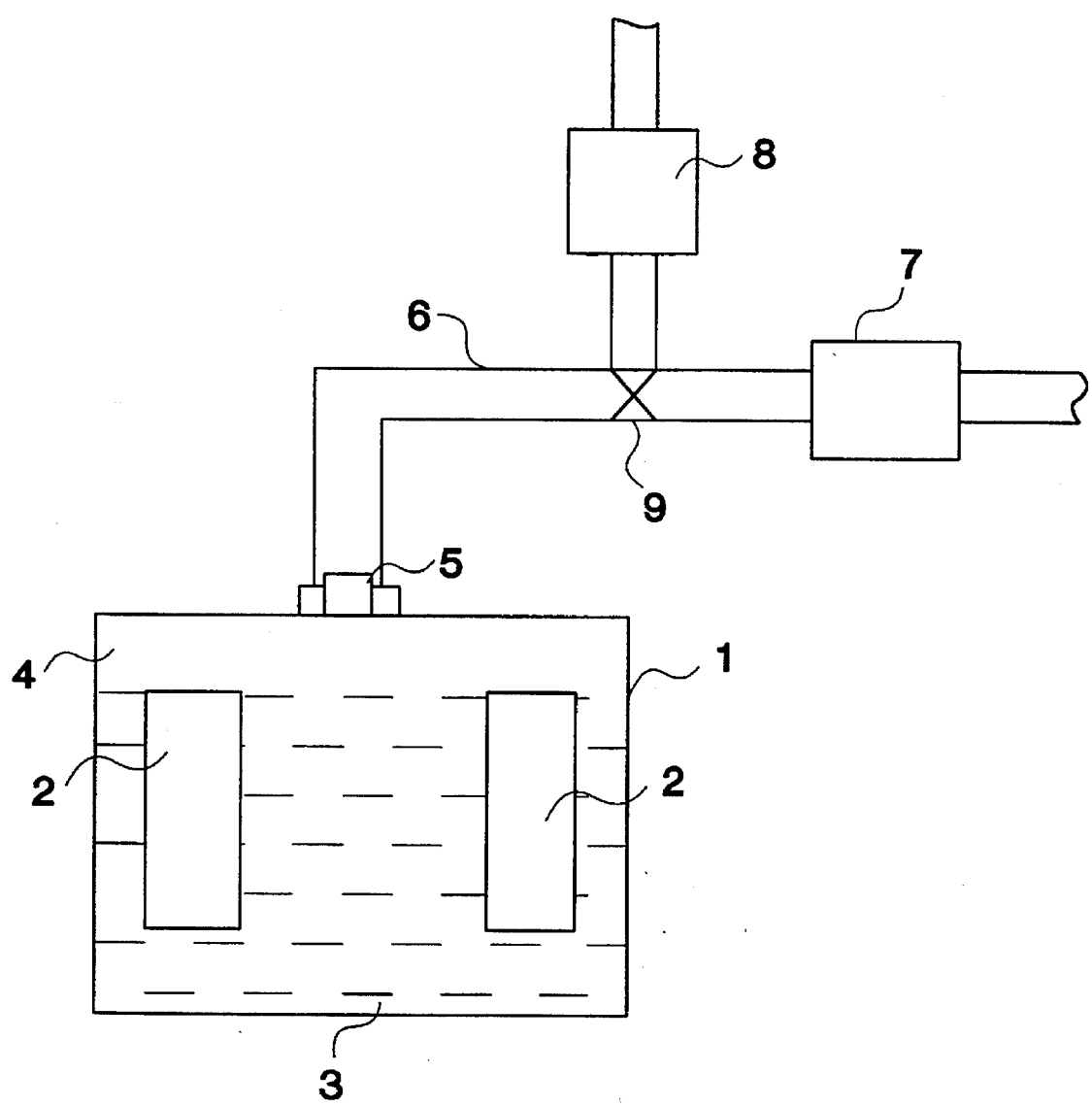

SECONDARY BATTERY AND METHOD FOR CONTROLLING THE SELF-DISCHARGE OF A NICKEL/METAL HYDRIDE SECONDARY BATTERY

BACKGROUND OF THE INVENTION

1. Related Applications

The present application is a continuation-in-part of application Ser. No. 08/434,532, filed May 4, 1995, now abandoned.

2. Field of the Invention

The present invention relates to an improved secondary battery and to a method for controlling the self-discharge of a nickel/metal hydride secondary battery. More particularly, the present invention is directed to an improved nickel/metal hydride secondary battery, wherein hydrogen or a mixture of hydrogen and an inert gas are substituted for the air normally contained in the cells of the battery.

3. Description of Related Art

Generally, a conventional nickel/metal hydride secondary battery has a number of advantages such as, for example, it has an energy sensibility of 1.5–2 times higher when compared with a conventional nickel/cadmium secondary battery; it has a high speed of charge and discharge; and it eliminates environmental pollution since it does not use a heavy metal such as cadmium. Therefore, the nickel/metal hydride secondary battery has been studied since 1985 and has been sold since 1991.

However, such a conventional nickel/metal hydride secondary battery suffers from a number of disadvantages, such as for example, it has a high speed of self-discharge. That is, the nickel/metal hydride secondary battery has only 60–80% of its charge quality after 6 months when compared with the nickel/cadmium secondary battery which retains 68–93% of its charge quality for the same period of time (J. Electrochem. Soc., Vol. 136, No. 5, May 1989).

The high speed of the self-discharge of the nickel/metal hydride secondary battery is caused by the discharging of hydrogen at the metal hydride cathode of the cell.

SUMMARY OF THE INVENTION

Accordingly, it is an object of the present invention to provide an improved method of controlling the self-discharge of a nickel/metal hydride secondary battery, and eliminating the problems encountered with respect to conventional secondary batteries.

Another object of the present invention is to provide a means for controlling the self-discharge of a nickel/metal hydride secondary battery by substituting hydrogen or a mixture of hydrogen and an inert gas for the air present in the cells of the battery. The hydrogen discharge at the cathode is substantially reduced by the state of equilibrium pressure established between the hydrogen gas or hydrogen-inert gas mixture and the metal hydride cathode and/or the temperature thereof.

A further object of the present invention is to provide a means for controlling the self-discharge of a nickel/metal hydride battery, by substituting hydrogen or a mixture of hydrogen and argon or nitrogen for the air present in the cell of the battery.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an improved nickel/metal hydride secondary battery, wherein hydrogen or a mixture of hydrogen and an inert gas such as argon, nitrogen, and the like is substituted for the air normally present in the cells of the nickel/metal hydride secondary battery. In the manufacture of a secondary battery, the cells therefor are made in the presence of ambient air and not in the presence of a vacuum. Thus, even if the cells are sealed, some air is inadvertently introduced into the battery cells in the space above the electrolyte during the manufacturing process. The air above the electrolyte can be removed by attaching a vacuum to a vent provided in the top of the battery and removing the air therefrom. The air thus removed can then be replaced with hydrogen gas or a hydrogen-inert gas mixture. The presence of the hydrogen gas, hydrogen-inert gas mixture minimizes the amount of self-discharge of the battery to an amount of less than about 40%, e.g., about 10 to 40%, advantageously about 10 to 20%.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 6 shows the removal of air from a secondary battery and the replacement of the air with hydrogen or a hydrogen/inert gas mixture.

DESCRIPTION OF THE PREFERRED EMBODIMENTS

Figure 3:
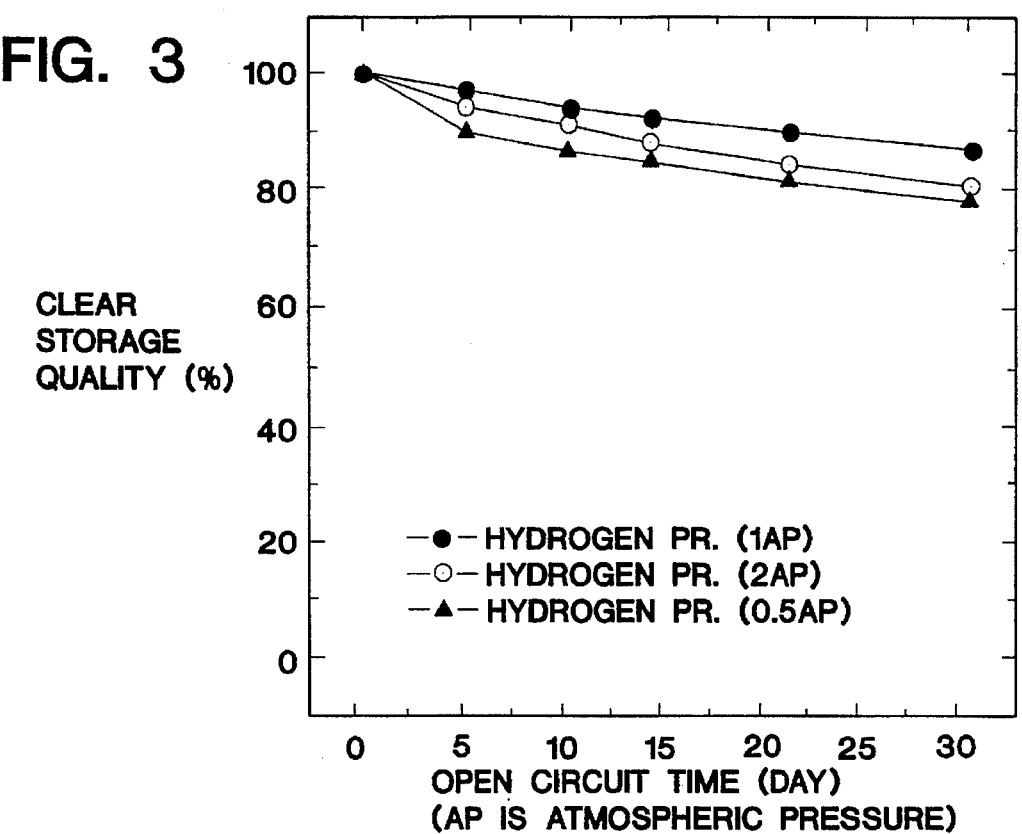
FIG. 3 is a graph showing the discharge of the storage changing quality of a nickel/metal hydride secondary battery with an open circuit according to the present invention under a hydrogen atmosphere.
Figure 4:
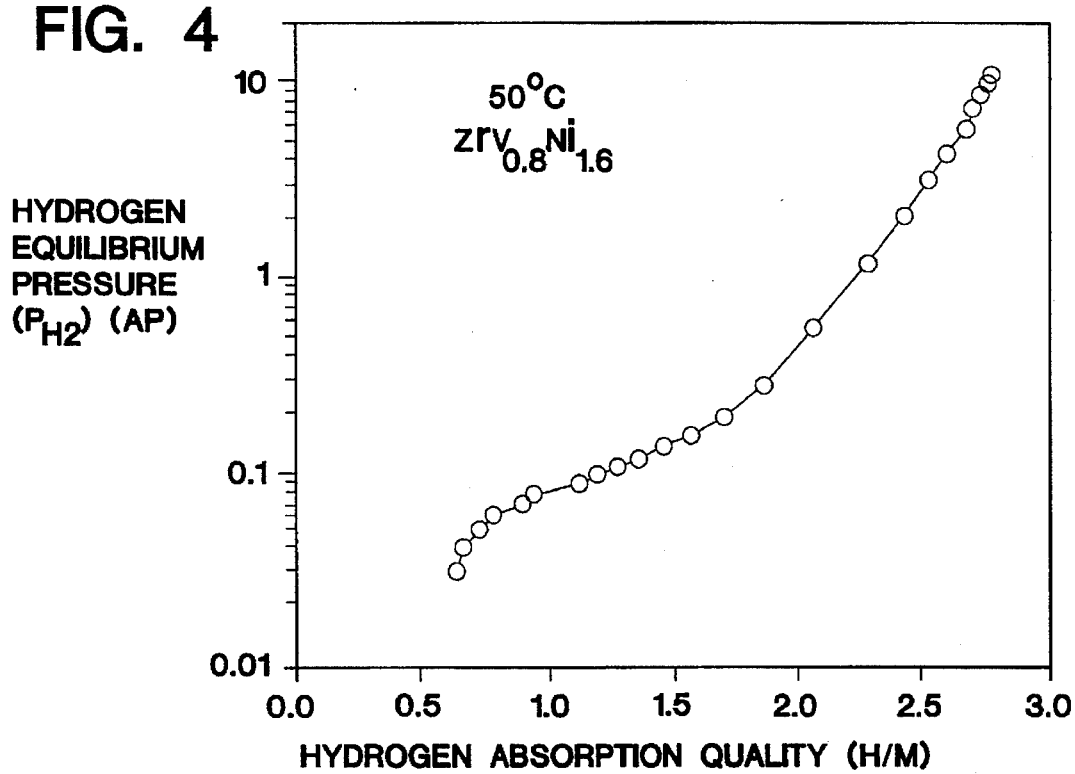
FIG. 4 is a graph showing a relationship of the hydrogen equilibrium pressure and the hydrogen absorbing quality depending on a hydrogen discharge according to the present invention under a temperature of 50° C. of $ZrV_{0.8}Ni_{1.6}$.
Figure 5:
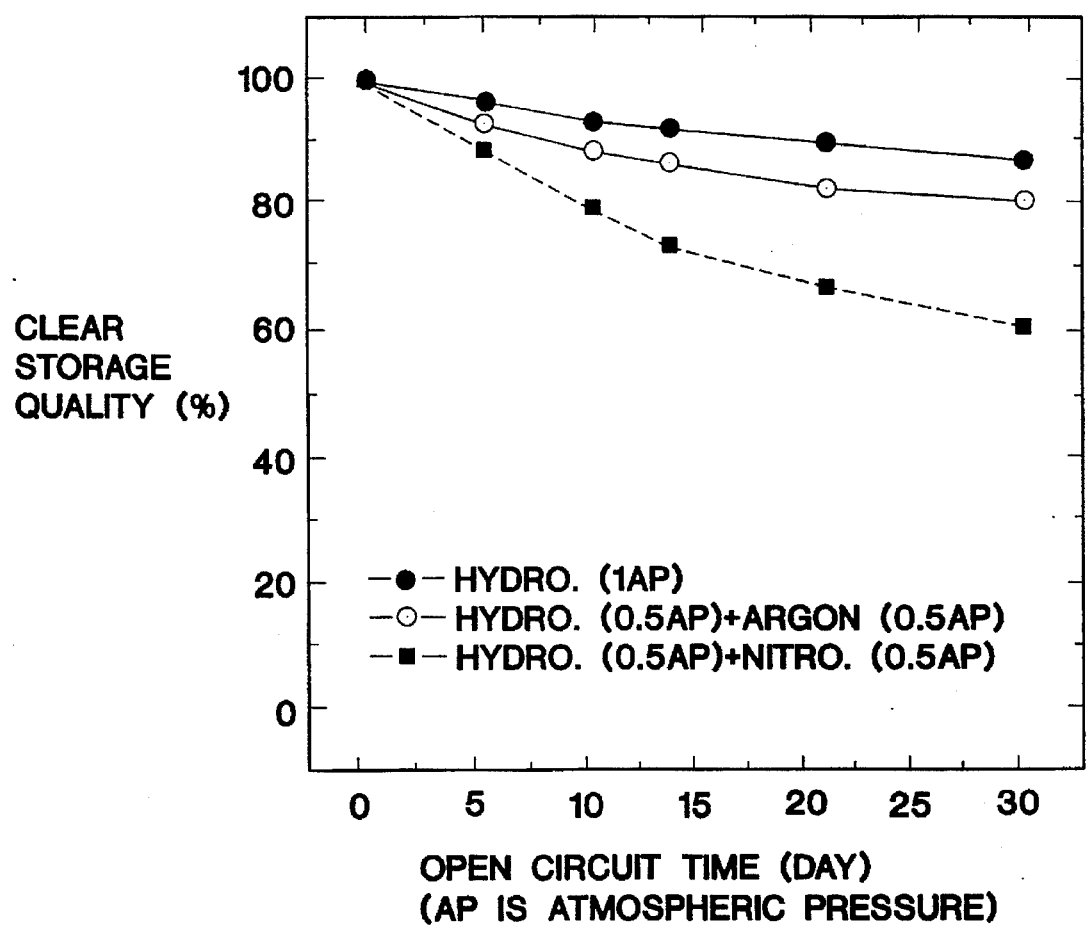
FIG. 5 is a graph showing the discharge of the storage changing quality of a nickel/metal hydride secondary battery according to the present invention under a hydrogen and inert gas atmospheric mixture.

Referring now in detail to the drawings for the purpose of illustrating preferred embodiments of the present invention, the method for controlling the self-discharge of a nickel/metal hydride secondary battery as shown in FIGS. 3, 4, and 5, comprises substituting hydrogen or a mixture of hydrogen and an inert gas for the air atmosphere contained in the cells of the battery. The inert gas is argon, nitrogen, and the like.

The nickel/metal hydride cathode of the secondary battery is manufactured by the following methods. 5 g of the metal hydride ingot, $ZrV_{0.8}Ni_{1.6}$ is melted by the use of an electric arc in an argon atmosphere. In order to compensate for the loss of Zirconium during the melting process, Zirconium is added to the ingot in an amount of about 3–5 percentage by weight and the $ZrV_{0.8}Ni_{1.6}$ ingot is powered to less than a 400 mesh without heat treatment.

In addition to the metal hydride, the electrode contains about 10 weight percentage of nickel powder and about 10 weight percentage of polytetrafluoroethylene (hereinafter "PTFE") and the mixture is compressed under 10 ton/cm² pressure for increasing the equilibrium state and the conductive degree of the electrode and to facilitate the function of the binder in a pellet configuration.

FIG. 6 shows a secondary battery 1 containing cells 2 and an electrolyte 3. The space 4 disposed above the electrolyte contains air which was introduced when the battery was manufactured. This air is removed through vent cap 5 and conduit 6 by a vacuum 7. After the air has been removed, hydrogen gas or a hydrogen/inert gas mixture is introduced by pump 8 and conduit 6 into the space vacated by the air. The valve 9 is operative to selectively operate either the vacuum 7 or the pump 8.

The anode used in the present invention is a conventional fused nickel anode, the separator is a polyamide, and the electrolyte is a 6M KOH and a 1 MLiOH mixture. The cell produced by the above process is charged in the electrolytic alkali for 4 hours, is stopped to discharge at 0.5 C speed and at a 0.95 voltage, and is cycled at 15–20 cycles to fully actuate the cell. Thereafter, when the cell volume is stable, the charge is completed and the self-discharge of the battery can be measured.

In the present invention, the method for controlling the self-discharge of the nickel/metal hydride secondary battery, comprises eliminating air in the battery cells, and replacing it with hydrogen or a mixture of hydrogen and an inert gas. That is, hydrogen or a mixture of hydrogen and inert gas is substituted for the air in the cells of the secondary battery.

The self-discharge of the secondary battery is substantially reduced because the hydrogen absorbed at the metal hydride cathode does not discharge. That is, the hydrogen or the mixture of hydrogen and inert gas establishes an equilibrium with the metal hydride cathode which reduces the discharging of the battery. The inert gas in the present invention is argon, nitrogen and the like.

Also, when the hydrogen or the mixture of hydrogen and inert gas is introduced into the cell, the atmospheric pressure is preferably 0.5–10 AP even though the atmospheric pressure does not influence the matter. Thus, by adding hydrogen or the mixture of hydrogen and inert gas to the cells, the hydrogen in the cathode and the hydrogen in the cell produce a hydrogen equilibrium state so that during a long, open circuit time period, the absorbed hydrogen does not discharge. Therefore, the self-discharge of the nickel/metal hydride secondary battery is effectively controlled.

Accordingly, the method according to the present invention provides a secondary battery having a high energy efficiency which does not contribute to environmental pollution as compared with the conventional nickel/cadmium secondary battery and also controls the self-discharge thereof.

The present invention will now be described in more detail in connection with the following examples which should be considered as being exemplary and not limiting the present invention.

EXAMPLE 1

As shown in FIG. 3, the self-discharge of the nickel/metal hydride secondary battery, according to the present invention in which a hydrogen atmosphere is utilized at pressures of 0.5, 1, and 2 AP, is generally less than 20 percent after an open circuit of 30 days. The reason for this is that the absorbed hydrogen remains at the cathode of the metal hydride cathode.

EXAMPLE 2

The nickel/metal hydride secondary battery according to the present invention (FIG. 4) shows an absorption quantity of hydrogen at the metal hydride cathode and the equilibrium pressure of the hydrogen atmosphere at a temperature of 50° C. As shown in FIG. 4, hydrogen is absorbed at less than 1 AP. Accordingly, since the hydrogen at the cathode and the hydrogen in the cell maintains an equilibrium pressure in the open circuit period, the self-discharge of the nickel/metal hydride secondary battery does not progress.

EXAMPLE 3

FIG. 5 shows the self-discharge state of a cell filled with hydrogen and a mixture of hydrogen and an inert gas. As shown in FIG. 5, the self-discharge in less than 20 percent at a hydrogen pressure of 1 AP and also when a mixture of hydrogen (0.5 AP) and argon (0.5 AP) is utilized. The self-discharge is more severe but still less than 40 percent when a mixture of hydrogen (0.5 AP) and argon (0.5 AP) is utilized. Thus the mixture of hydrogen with argon or nitrogen has an anti-self-discharge effect.

Comparative Example

Figure 1:
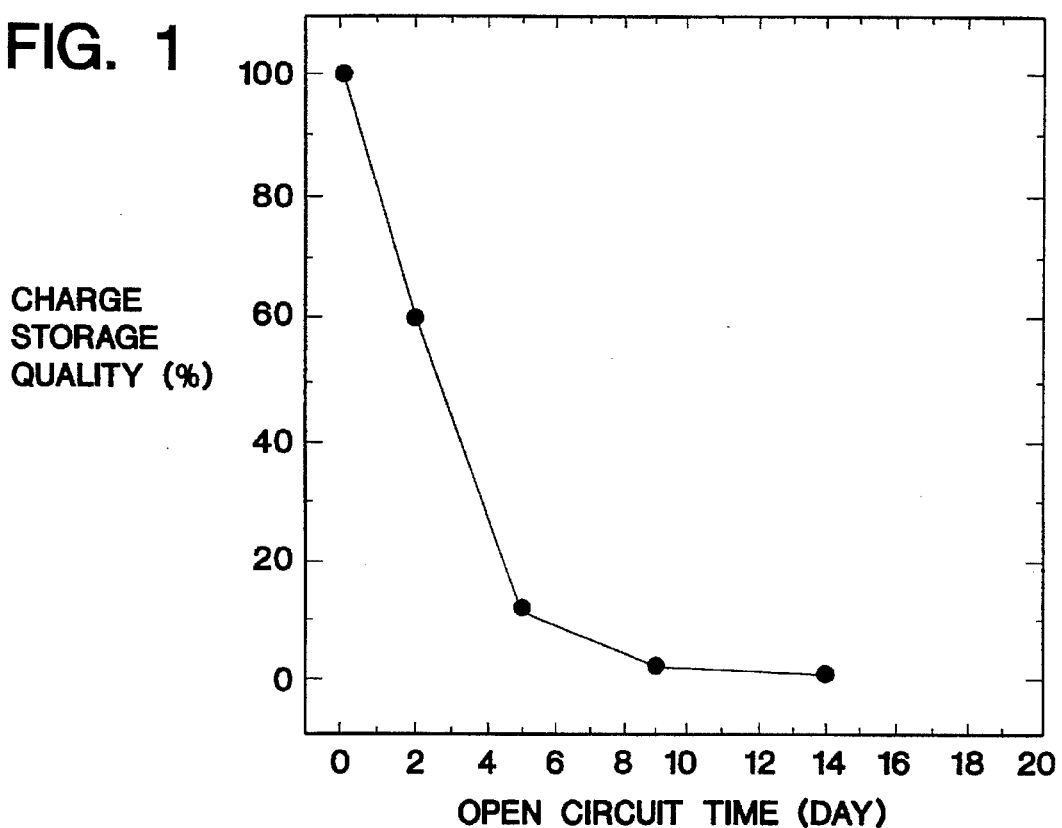
FIG. 1 is a graph showing the discharge of the storage changer quality of a nickel/metal hydride secondary battery with an open circuit as a comparative example conducted under an atmospheric pressure (hereinafter "AP"), of one atmosphere.
Figure 2:
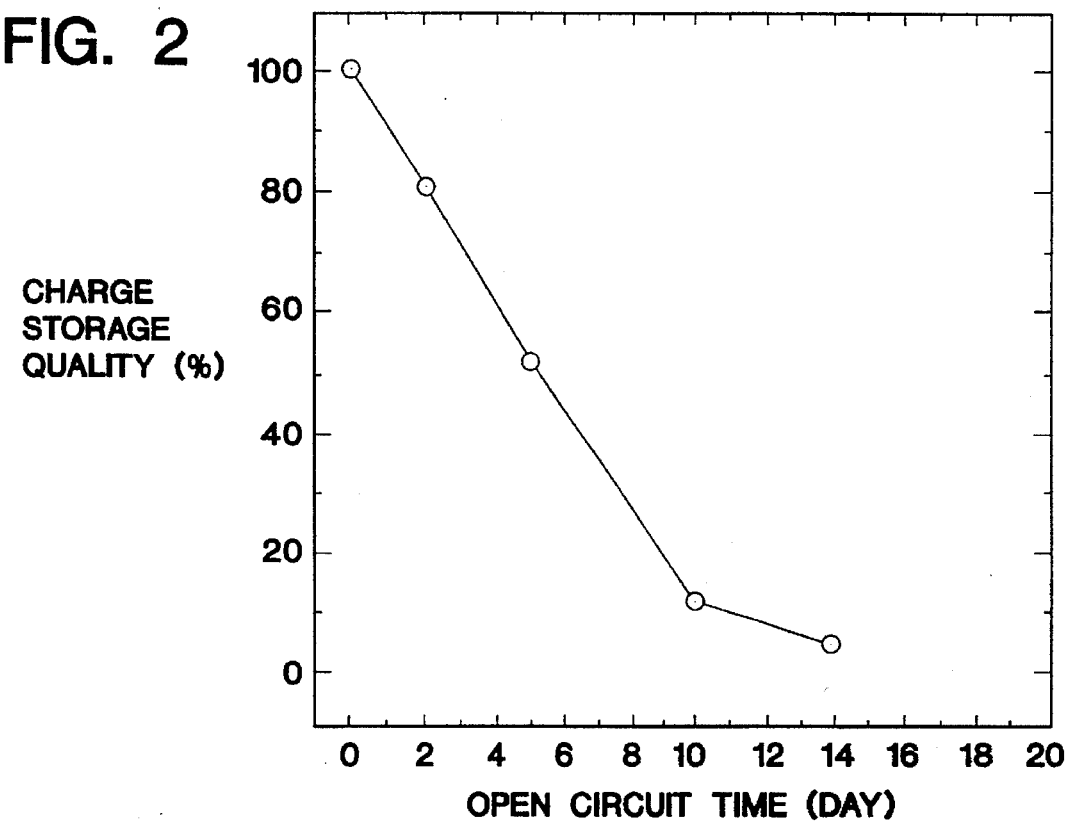
FIG. 2 is a graph showing the discharge of the storage charger quality of a nickel/metal hydride secondary battery with an open circuit as a comparative example conducted under an argon atmosphere of one atmosphere pressure.

FIGS. 1 and 2 show the self-discharge state of a fully, active cell with an open circuit. As shown in FIG. 1, the discharge in an air atmosphere and at 1 AP progresses to more than 90 percent after 5 days and is fully depleted after 9 days. As shown in FIG. 2, the discharge in an argon atmosphere and at 3 AP progresses to more than 95 percent after 10 days. That is, in an air atmosphere or only an argon atmosphere, the self-discharge cannot be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nickel/metal hydride secondary battery which exhibits a reduced amount of self-discharge, said secondary battery containing battery cells, an electrolyte, and a gas environment above the electrolyte, wherein the gas environment is hydrogen gas or a hydrogen-inert gas mixture.

2. The nickel/metal hydride secondary battery of claim 1, wherein the inert gas is argon or nitrogen.

3. The nickel/metal hydride secondary battery of claim 1, wherein the gas environment has a pressure of 0.5 to 10 atmospheres.

4. A method of reducing the amount of self-discharge of a nickel/metal hydride secondary battery containing air which is present in the cells of the battery which comprises removing the air from the battery cells and replacing the air with hydrogen or a hydrogen-inert gas mixture.

5. The method of claim 4, wherein the air is removed by vacuum.

6. The method of claim 5, wherein the space vacated by the air is replaced with said hydrogen gas or said hydrogen/inert gas mixture.

7. The method of claim 4, wherein the amount of self-discharge is less than 20%.

8. The method of claim 4, wherein the amount of self-discharge is less than 40%.

* * * * *